United States Patent [19]
Ozaki et al.

[11] Patent Number: 5,985,202
[45] Date of Patent: *Nov. 16, 1999

[54] METHOD FOR PRODUCING A LAMINATED OBJECT AND APPARATUS FOR PRODUCING THE SAME

[75] Inventors: Motoaki Ozaki, Okazaki; Yukio Otsuka, Aichi-ken; Hiromoto Satoh, Nagoya, all of Japan

[73] Assignee: Toyota Jidosha Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,401

[22] Filed: Dec. 2, 1997

[30] Foreign Application Priority Data

Dec. 6, 1996 [JP] Japan .................................... 8-327067

[51] Int. Cl.$^6$ ............................. B29C 35/08; B29C 41/02
[52] U.S. Cl. ....................... 264/401; 264/113; 264/219; 264/308; 264/497; 419/61; 425/135; 425/174.4
[58] Field of Search ................................... 264/113, 219, 264/308, 401, 497; 425/135, 174.4; 419/61

[56] References Cited

U.S. PATENT DOCUMENTS

| | | | |
|---|---|---|---|
| 4,247,508 | 1/1981 | Housholder | 264/219 |
| 4,575,330 | 3/1986 | Hull | 425/174.4 |
| 4,600,309 | 7/1986 | Fay | 356/401 |
| 5,290,992 | 3/1994 | Lin et al. . | |
| 5,354,414 | 10/1994 | Feygin | 156/630 |
| 5,364,744 | 11/1994 | Buican et al. | 430/321 |
| 5,504,301 | 4/1996 | Eveland | 219/121.67 |
| 5,519,724 | 5/1996 | Tatah . | |
| 5,718,279 | 2/1998 | Satoh et al. . | |

FOREIGN PATENT DOCUMENTS

| | | |
|---|---|---|
| 0416852A2 | 3/1991 | European Pat. Off. . |
| 0450762A1 | 10/1992 | European Pat. Off. . |
| 0 577 260 A2 | 1/1994 | European Pat. Off. . |
| 0525872A1 | 2/1994 | European Pat. Off. . |
| 0 776 713 A2 | 6/1997 | European Pat. Off. . |
| 4415783A1 | 8/1995 | Germany . |
| 3-183530 | 8/1991 | Japan . |
| WO 91/12120 | 8/1991 | WIPO . |

OTHER PUBLICATIONS

Abstract of Japan 63–177,004 (Published Jul. 21, 1988).
Abstract of Japan 63–243,804 (Published Oct. 11, 1988).
Abstract of Japan 7–1,593 (Published Jan. 6, 1995).
Abstract of Japan 7–266,429 (Published Oct. 17, 1995).
European Search Report dated Mar. 20, 1998 (2 pages).
Communication dated Mar. 27, 1998 (1 page).
English Abstract of JP 03 208678A, *Patent Abstracts of Japan*, vol. 15, No. 485, Dec. 9, 1991.
English Abstract of JP 02163925, publication date Jun. 25, 1990.
English Abstract of JP 01232027, publication date Sep. 18, 1989.

*Primary Examiner*—Leo B. Tentoni
*Attorney, Agent, or Firm*—Finnegan, Henderson, Farabow, Garrett & Dunner, L.L.P.

[57] ABSTRACT

A method and apparatus for forming a laminated object using a laser-discharging means a laser beam, a material capable of forming a solid layer by receiving the laser beam, and a mask for interrupting the laser beam. The method includes the steps of: forming a layer of the material on a surface, covering the material with the mask, and discharging the laser beam onto the material covered with the mask to solidify the material and form the solid layer on the surface. The above cycle is repeated to produce a laminated object. The method and the apparatus are characterized in the adjusting at least one of a distance from the laser-discharging means to the mask and a distance from the mask to the material, so that the extent of the laser beam is adjusted and the dimension of the laminated object is adjusted.

24 Claims, 3 Drawing Sheets

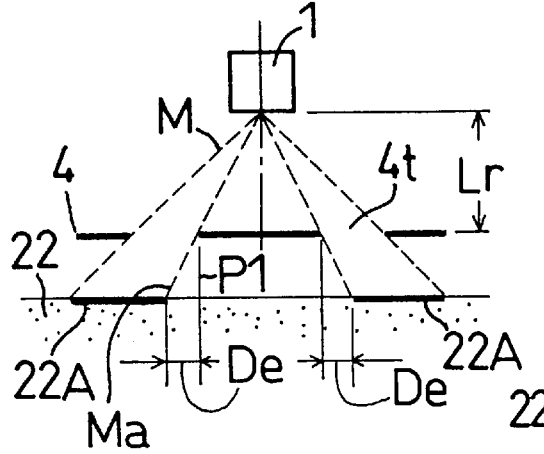
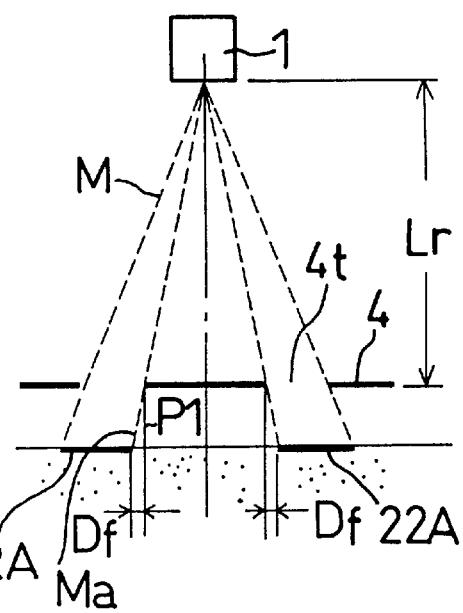
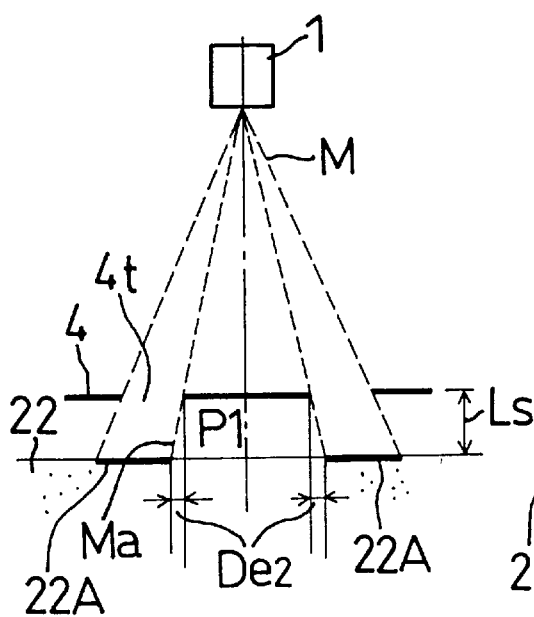
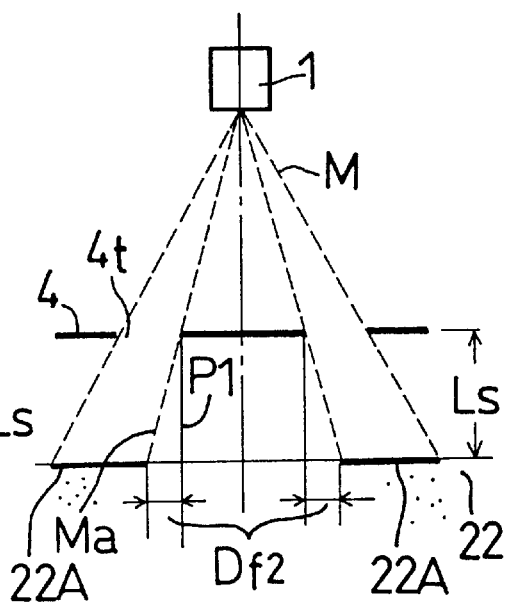

METHOD FOR PRODUCING A LAMINATED OBJECT AND APPARATUS FOR PRODUCING THE SAME

BACKGROUND OF THE INVENTION

1. Field of the Invention

The present invention relates to a method for producing a three-dimensional laminated object by receiving a laser beam passed through a mask, and an apparatus for producing the same.

2. Description of Related Art

Recently, a method has been developed for producing a three-dimensional laminated object, and it is disclosed in Japanese Unexamined Patent Publication (KOKAI) No.3-183,530, and U.S. Pat. No. 4,247,508. In this method, a material capable of forming a solid layer, such as resin-coated sand and liquefied resin, is used. Also, the material is irradiated by a discharged laser beam to form a thin solid layer. A large number of thin solid layers are continuously piled to produce a three-dimensional laminated object by discharging the laser beam repeatedly.

SUMMARY OF THE INVENTION

The applicant of the present invention has developed a technique that the material capable of forming the solid layer is covered with a mask having an opening window, and a laser beam is discharged to the material covered with the mask. This technique is unknown as at Japanese filing date of the present invention. In this technique, a laminated object is adequately produced to correspond with a pattern shape of the opening window of the mask, so that efficiency is improved in discharging the laser beam to increase production ability.

Now, in the aforementioned method for producing the three-dimensional laminated object, the laminated object may require a correction in dimension. For example, when the three-dimensional laminated object is a sand mold for casting, a designer expects a contraction-rule, a shrinkage scale, in designing the sand mold in such a manner that the sand mold is produced on the basis of the contraction-rule.

In the case where molten metal is poured into the produced sand mold to form a casting actually, the dimension of the actually formed casting may slightly differ from the designer-expected dimension. This difference in the dimension requires a correction in the contraction-rule.

In the aforementioned technique using the mask, such correction requires a change in the shape of the opening window of the mask to demand time and labor considerably.

The present invention has been developed in view of this circumstance. It is therefore an aim of the present invention to provide a method and an apparatus capable of correcting a dimension of a three-dimensional laminated object without difficulty.

In the first aspect of the present invention, a method for producing a laminated object uses a laser-discharging means for discharging a laser beam, a material capable of forming a solid layer by receiving the laser beam, and a mask for interrupting the laser beam. The method comprises the steps of:

covering the material with the mask, and discharging the laser beam to the material covered with the mask for the material to form a solid layer for producing a laminated object, wherein the method is characterized in adjusting at least one of a distance from the laser-discharging means to the mask and a distance from the mask to the material.

In the second aspect of the present invention, an apparatus for producing a laminated object comprises;

a laser-discharging means for discharging a laser beam to a material capable of form a solid layer by receiving the laser beam, a mask holder disposed between the laser-discharging means and the material, and capable of holding a mask for interrupting the laser beam, and a distance-adjusting means for adjusting at least one of a distance from the laser-discharging means to the mask and a distance from the mask to the material.

According to the first aspect and the second aspect of the present invention, supposing that "Lr" exhibits a distance from the laser-discharging means to the mask, and supposing that "Ls" exhibits a distance from the mask to the material, at least one of "Lr" and "Ls" is adjusted. This enables the laser beam to be adjusted in extent. In such aspects, the adjustment may be carried out in the both of "Lr" and "Ls".

The adjustment of "Lr" may display a change in at least one of the height of the laser-discharging means and the height of the mask. The adjustment of "Ls" may display a change in at least one of the height of the mask and the height of the material.

In the apparatus of the present invention, the distance-adjusting means may be at least one selected from the group consisting of: (1) a laser-height changing means that changes a height of the laser-discharging means with respect to the mask and the material, (2) a mask- height changing means that changes a height of the mask with respect to the material, and (3) a material-height changing means that changes a height of the material with respect to the mask.

The material concerning the present invention is a material that becomes a solid mass, a solid layer, by receiving the laser beam. The material may be powder such as resin-coated sand, liquefied resin, powder metal, etc. The resin-coated sand may be constituted from sand particles coated with thermosetting resin. The material is also called a solidable material or a bondable material that bonds together itself to become a solid layer by receiving the laser beam. The solidable material can mean a sintering material.

The laser beam concerning the present invention may be a $CO_2$ laser beam, a YAG laser beam, a Ar laser beam, etc, including both a visible ray and a non visible ray.

The method and apparatus of the present invention make it possible to adjust the extent of the laser beam passed through the mask; therefore they enable the three-dimensional laminated object such as the sand mold to be corrected in the dimension.

BRIEF DESCRIPTION OF THE DRAWINGS

A more complete appreciation of the present invention and many of its advantages will be readily obtained.

FIG. 4(A) is a constitutional drawing for illustrating a configuration adjusting a height of a laser-discharging means;

FIG. 4(B) is a constitutional drawing for illustrating a configuration adjusting a height of a laser-discharging means;

FIG. 5(A) is a constitutional drawing for illustrating a configuration adjusting a height of a mask; and FIG. 5(B) is a constitutional drawing for illustrating a configuration adjusting a height of a mask.

DETAILED DESCRIPTION OF THE PREFERRED EMBODIMENT

Having generally described the present invention, a further understanding can be obtained by reference to the specific preferred embodiments which are provided herein for purposes of illustration only and are not intended to limit the scope of the appended claims.

Referring now to Figures, there will be described an embodiment of the present invention.

Figure 1:
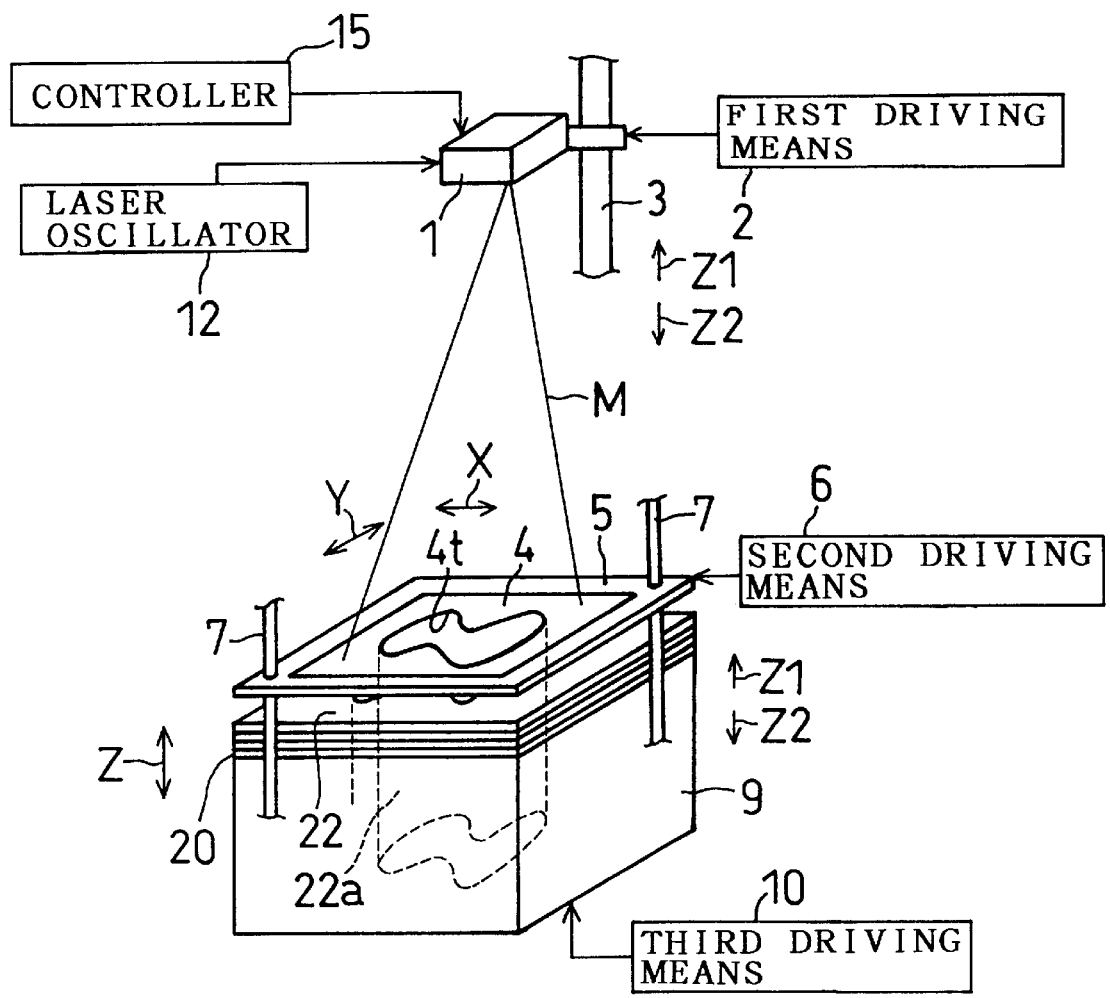
FIG. 1 is a constitutional drawing for illustrating the main construction schematically.

In the present embodiment, "X" direction and "Y" direction in FIG. 1 exhibit the horizontal directions, and "Z" direction in FIG. 1 exhibits the height direction. A first driving means 2 is connected with a laser-discharging means 1 for discharging a laser beam. When the first driving means 2 is driven, the laser-discharging means 1 rises and falls along a first guide portion 3 disposed perpendicularly, along the height direction, the arrow directions of "Z1" and "Z2". This enables the laser-discharging means 1 to be adjusted in height. Therefore, the first driving means 2 works as the laser-height changing means that changes a height of the laser-discharging means, so that it functions as a distance-adjusting means.

A second driving means 6 is connected with a mask holder 5. A mask 4, having a plate-shape and having ability for interrupting the laser beam, is held on the mask holder 5. The mask 4 is constituted by use of a laser-resistant plate selected in the group of steel plates, Al-coated plates, and so on.

An opening window 4t, having a designated pattern, is formed in the mask 4 in such a manner that the laser beam penetrates the mask 4. When the second driving means 6 is driven, the mask holder 5 rises and falls with the mask 4 along the second guide portion 7 disposed perpendicularly, along the height direction, the arrow directions of "Z1" and "Z2". This enables the mask 4 to be adjusted in height direction. Therefore, the second driving means 6 works as the mask-height changing means that changes a height of the mask 4, so that it functions as a distance-adjusting means.

A third driving means 10 is connected with a lift table 9. When the third driving means 10 is driven, the lift table 9 rises and falls along the height direction, the arrow directions of "Z1" and "Z2". This enables a height of the sand layer 22 to be adjusted on the lift table 9. Therefore, the third driving means 10 works as the material-height changing means that changes a height of the material, so that it functions as a distance-adjusting means.

A hydraulically-operated mechanism and an air-operated mechanism, for instance, a cylinder installation and a motor installation, may be employed as the first driving means 2, the second driving means 6, and the third driving means 10. The motor installation may be a step motor to be driven in response to the number of electric pulses.

Figure 2:
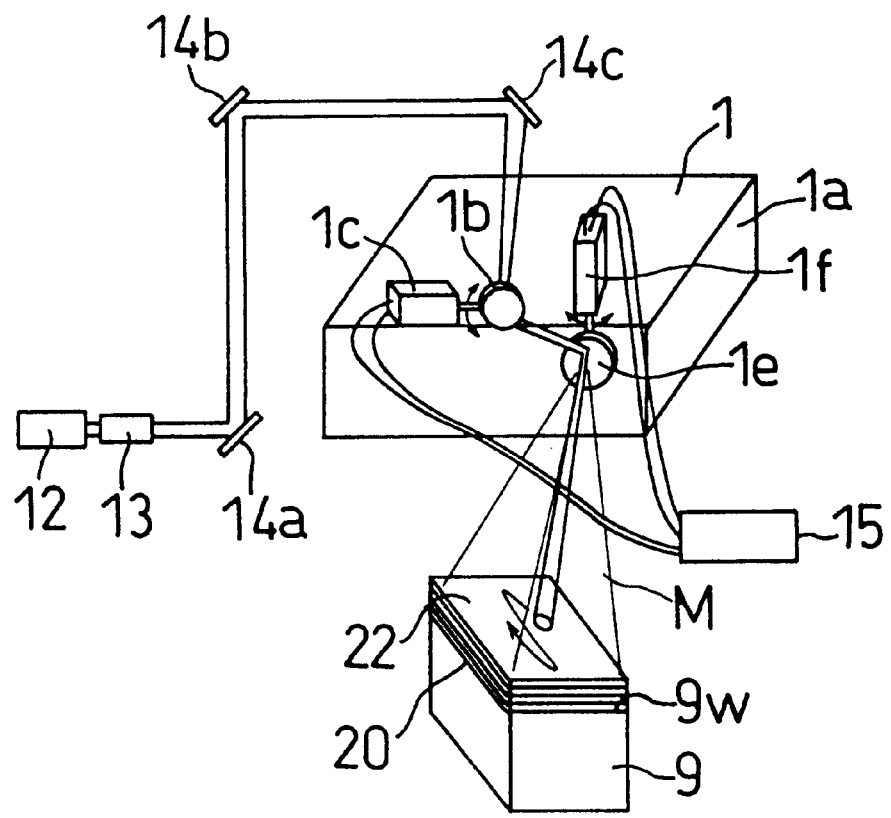
FIG. 2 is a constitutional drawing for illustrating the vicinity of laser-discharging means schematically.

FIG. 2 shows the laser-discharging means 1 including a housing 1a, a galvonoscanner 1c having a swinging mirror 1b for scanning the laser beam, and a galvonoscanner 1f having a swinging mirror 1e for scanning the laser beam.

A laser beam is discharged from a laser oscillator 12 to be extended in beam-diameter with a beam expander 13, and it reaches the swinging mirror 1e by way of the mirrors 14a–14c, and the swinging mirror 1b, the laser beam M diffuses, i.e., it diverges on its path from the laser discharging means 1 to the sand layer 22, as shown in the Figures.

A controller 15 controls the swinging mirror 1b, 1e to discharge the laser beam in such a manner that the laser beam depicts a curve such as a sine curve.

In the present embodiment, a sand mold 20, including a core mold and an outer mold, is produced as the three-dimensional laminated object.

This case for the sand mold 20 will be explained hereinafter. First, a sand-depositing step is carried out. In this step, as can be appreciated from FIG. 3, a thin sand layer 22 is deposited on a setting surface 9w of the lift table 9. The thickness of the sand layer 22 is selectable in response to kinds of the three-dimensional laminated object, and it preferably falls in 0.1–0.4 mm, in particular, in approximately 0.2 mm.

Figure 3:
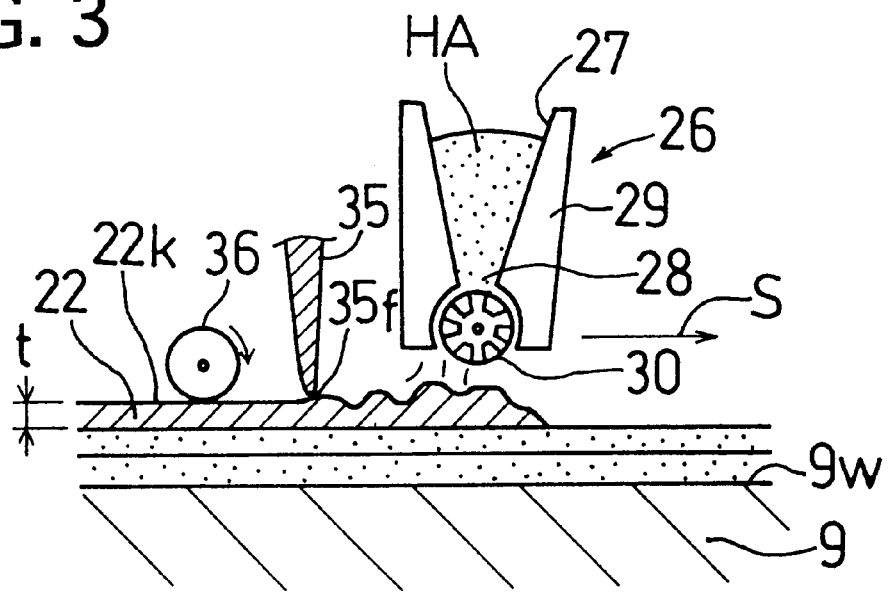
FIG. 3 is a constitutional drawing for illustrating a sand-depositing step.

In depositing sand, a depositing apparatus 26 shown in FIG. 3 is employed. The depositing apparatus 26 includes a container 29 having a storing room 27 and an outlet 28, a cutting roller 30 rotatably disposed in the bottom of the container 29, a raking member 35, and a rotating level roller 36. The resin-coated sand "HA" is accumulated in the storing room 27. The resin-coated sand "HA", working as the material capable of forming a solid layer, is constituted from sand-particles coated with thermosetting resin; so it has a property to become a solid layer, a sintered layer, because of receiving the laser beam.

The depositing apparatus 26 is horizontally moved at a constant speed along the setting surface 9w of the lift table 9 in the arrow direction of "S" with the cutting roller 30 rotating. Thus, the resin-covered sand "HA" is deposited on the setting surface 9w of the lift table 9.

As appreciated from FIG. 3, the raking member 35 is moved in the same direction to come into contact with the resin-coated sand "HA" deposited on the setting surface 9w in order that the excessively deposited resin-coated sand "HA" on the setting surface 9w is raked. As a result, the sand layer 22 is formed with flatness. An upper surface 22k of the sand layer 22 is also finished by the rotating level roller 36 moving in the same direction. So, it is employed that the depositing apparatus 26 comes into contact with the sand layer 22 on the setting surface 9w in the present embodiment.

After the sand-depositing step, a laser-discharging step is carried out. In the laser-discharging step, after the upper surface 22k of the sand layer 22 is covered with the mask 4, a laser beam M is discharged from the laser-discharging means 1. In the laser-discharging step, the laser beam M discharged from the laser-discharging means 1 penetrates the opening window 4t of the mask 4, reaching the sand layer 22 to heat the sand layer 22.

In the sand layer 22, the sand portion irradiated by a laser beam M bonds together, and it becomes a solid mass to form a solid layer 22A. On the other hand, in the sand layer 22, since the sand portion covered with the mask 4 isn't irradiated by the laser beam M, it doesn't bond together, namely, it doesn't form a solid layer 22A; thus, it is capable of being removed from the solid layer 22A.

After the laser-discharging step, the lift table 9 falls by an amount "K" (not shown) in the arrow direction "Z2". The amount "K" is substantially equal to the thickness of the sand layer 22.

Further, for carrying out the sand-depositing step again, the depositing apparatus 26 is horizontally moved along the solid layer 22A on the lift table 9 in the arrow direction of "S" with the cutting roller 30 rotating. Thus, the resin-coated sand "HA" is also deposited on the solid layer 22A on the setting surface 9w of the lift table 9 to dispose a sand layer 22 newly. Thereafter, for the laser-discharging step, the laser beam is also discharged to the new sand layer 22.

In the present embodiment, the aforementioned sand-depositing step and the aforementioned laser-discharging step are repeated sequentially. As a result, the method for producing the laminated object is carried out to form the sand mold 20.

In the case where molten metal is poured into the sand mold 20 to form a casting actually, the dimension of the actually formed casting sometimes slightly differs from the designer-expected dimension of the casting. This requires a correction in dimension. This correction is available in increasing a contraction-rule and in decreasing a contraction-rule.

For increasing the contraction-rule, as appreciated from FIG. 4(A), the laser-discharging means 1 descends in the height direction with the sand layer 22 and the mask 4 being kept as they are. This decreases "Lr", a distance between the laser-discharging means 1 and the mask 4.

In FIG. 4(A), "P1" exhibits a perpendicular line falling from an edge of the opening window 4t of the mask 4 to the sand layer 22, and "Ma" exhibits the laser beam penetrating the edge of the opening window 4t of the mask 4. An amount between the perpendicular line "P1" and the laser beam "Ma" is enlarged to indicate "De", as shown in FIG. 4(A). Accordingly, the extent of the laser beam is increased beyond the mask 4.

On the other hand, for decreasing the contraction-rule, as appreciated from FIG. 4 (B), the laser-discharging means 1 ascends in the height direction with the sand layer 22 and the mask 4 being kept as they are. This increases "Lr", a distance between the laser-discharging means 1 and the mask 4. As a result, an amount between the perpendicular line "P1" and the laser beam "Ma" is reduced to indicate "Df", as shown in FIG. 4(B). Accordingly, the extent of the laser beam is decreased beyond the mask 4.

Also, the following adjustment may be carried out by using the height of the mask 4. For decreasing the contraction-rule, as appreciated from FIG. 5(A), the mask 4 descends in the height direction with the laser-discharging means 1 and the sand layer 22 being kept as they are. This decreases "Ls", a distance between the sand layer 22 and the mask 4.

In FIG. 5(A), "P1" exhibits a perpendicular line falling from an edge of the opening window 4t of the mask 4 to the sand layer 22, and "Ma" exhibits the laser beam penetrating the edge of the opening window 4t in the mask 4. An amount between the perpendicular line "P1" and the laser beam "Ma" is reduced to indicate "De 2", as shown in FIG. 5(A). Accordingly, the extent of the laser beam is decreased beyond the mask 4.

On the other hand, for increasing the contraction-rule, as appreciated from FIG. 5(B), the mask 4 ascends in the height direction to increase "Ls", a distance between the sand layer 22 and the mask 4. As a result, an amount between the perpendicular line "P1" and the laser beam "Ma" is increased to indicate "Df 2", as shown in FIG. 5(B). Accordingly, the extent of laser beam is increased beyond the mask 4.

In the present embodiment having the above-mentioned method, the contraction-rule of the sand mold 20 is corrected in the surface direction of the sand layer 22, X direction and Y direction. Therefore, the dimension is corrected in the casting formed by the sand mold 20.

Further, in the case where the contraction-rule is corrected in the height direction, the arrow direction of "Z", the correction is carried out by adjusting an amount "K" in lowering the lift table 9. Concretely, in the case where the contraction-rule of the sand mold is increased, the amount "K" is increased to be (K+α). Provided that the height of a pointed end 35f of the raking member 35, deciding the height of the upper surface 22k of the sand layer 22, is kept, the thickness of the sand layer 22 is increased by the increment "α".

As a result, the height dimension of the sand mold is increased because of piling up the increment "α".

On the other hand, in the case where the contraction-rule of the sand mold is decreased in the arrow direction of "Z", the amount "K" is reduced to be (K−α), the thickness of the sand layer 22 is reduced by the decrement "α". As a result, the height of the sand mold is decreased because of piling up the decrement "α".

What is claimed is:

1. A method for producing a laminated object using a laser-discharging means for discharging a laser beam, a material capable of forming a solid layer by receiving said laser beam, and a mask for interrupting said laser beam, which method comprises the steps of:
   (a) depositing a first unsolidified layer of said material on a surface;
   (b) covering said layer with said mask;
   (c) discharging said laser beam so as to irradiate said unsolidified layer with a diverging laser beam and form a solid layer of said material on said surface;
   (d) successively forming additional solid layers of said material, each laminated on a preceding solid layer, by depositing a subsequent unsolidified layer of said material on a preceding one of said solid layers and repeating steps (b) and (c); and
   (e) after at least one of said solid layers is formed, adjusting at least one of a distance from said laser-discharging means to said mask and a distance from said mask to an unsolidified layer of said material.

2. The method according to claim 1, wherein a distance from said laser-discharging means to said mask is adjusted.

3. The method according to claim 1, wherein a distance from said mask to said material is adjusted.

4. The method according to claim 1, wherein said laser-discharging means is connected with a first driving means; when said first driving means is driven, said laser-discharging means rises and falls in the height direction to adjust a distance from said laser-discharging means to said mask.

5. The method according to claim 1, wherein said laser-discharging means is guided along a first guide portion disposed perpendicularly to adjust a distance from said laser-discharging means to said mask.

6. The method according to claim 1, wherein said mask is disposed on a mask holder connected with a second driving means; when said second driving means is driven, said mask holder rises and falls with said mask in the vertical direction to adjust one of a distance from said laser-discharging means to said mask and a distance from said mask to said material.

7. The method according to claim 1, wherein said mask holder is guided along a second guide portion disposed perpendicularly to adjust one of a distance from said laser-discharging means to said mask and a distance from said mask to said material.

8. The method according to claim 1, wherein said first unsolidified layer of said material is deposited on a lift table capable of descending in the vertical direction.

9. The method according to claim 1, wherein said material is one selected from the group consisting of sand particles coated with thermosetting resin, liquefied resin, and powder metal.

10. The method according to claim 1, wherein said laminated object is a sand mold for casting.

11. The method according to claim 1, wherein said mask is formed of a laser beam-resistant plate.

12. The method according to claim 1, wherein said mask has an opening window through which said laser beam passes to said material.

13. An apparatus for producing a laminated object, as defined in claim 1, and comprising:

a laser-discharging means for discharging a diverging laser beam to a material capable of forming a solid layer by receiving said laser beam, means for depositing an unsolidified layer of said material on a surface so as to receive said laser beam and form a solid layer of said material on said surface when irradiated by said laser beam a mask holder disposed between said laser-discharging means and said unsolidified layer of said material, and capable of holding a mask for interrupting said laser beam, and a distance-adjusting means for adjusting at least one of a distance from said laser-discharging means to said mask and a distance from said mask to said unsolidified layer of material.

14. The apparatus according to claim 13, further comprising a first driving means connected with said laser-discharging means for raising and lowering the laser-discharging means when said first driving means is driven.

15. The apparatus according to claim 13, further comprising a first guide portion disposed perpendicularly to said surface for guiding said laser-discharging means along said first guide portion in the vertical direction.

16. The apparatus according to claim 13, further comprising a second driving means connected with said mask holder for raising and lowering said mask holder with said mask in the vertical direction when the second driving means is driven.

17. The apparatus according to claim 13, further comprising a second guide portion disposed perpendicularly to said surface, and capable of guiding said mask holder in the vertical direction.

18. The apparatus according to claim 13, further comprising a lift table having said surface for depositing said material, and capable of moving in the vertical direction to lower said material with respect to one of said mask and said laser-discharging means.

19. The apparatus according to claim 13, wherein said mask is formed of a laser-resistant plate.

20. The apparatus according to claim 13, wherein said mask has an opening window through which said laser beam passes to said material.

21. The apparatus according to claim 13, wherein the distance-adjusting means is at least one selected from the group consisting of: (1) a laser-height changing means for changing a height of said laser-discharging means with respect to said mask and said unsolidified layer of said material, (2) a mask-height changing means for changing a height of said mask with respect to said unsolidified layer of said material, and, (3) a material-height changing means for changing a height of said unsolidified layer of said material with respect to said mask.

22. The method according to claim 1, wherein said material is resin-coated sand.

23. The method according to claim 1, further including the step of smoothing said unsolidified layers prior to irradiating said layers with said laser beam.

24. The method according to claim 1, wherein said adjusting step is performed after each of said solid layers is formed.

* * * * *